(12) United States Patent
Nagendran et al.

(10) Patent No.: US 11,964,202 B2
(45) Date of Patent: Apr. 23, 2024

(54) PEER TO PEER COMMUNICATION SYSTEM AND METHOD

(71) Applicant: MURSION, INC., San Francisco, CA (US)

(72) Inventors: Arjun Nagendran, San Mateo, CA (US); Brian D. Kelly, Orlando, FL (US)

(73) Assignee: Mursion, Inc., San Francisco, CA (US)

( * ) Notice: Subject to any disclaimer, the term of this patent is extended or adjusted under 35 U.S.C. 154(b) by 327 days.

(21) Appl. No.: 17/312,347

(22) PCT Filed: Feb. 22, 2019

(86) PCT No.: PCT/US2019/019203
§ 371 (c)(1),
(2) Date: Jun. 9, 2021

(87) PCT Pub. No.: WO2020/171824
PCT Pub. Date: Aug. 27, 2020

(65) Prior Publication Data
US 2022/0040572 A1    Feb. 10, 2022

(51) Int. Cl.
*A63F 13/34* (2014.01)
*G06F 3/16* (2006.01)
*G10L 25/57* (2013.01)
*H04N 7/04* (2006.01)
*H04N 7/15* (2006.01)

(52) U.S. Cl.
CPC .............. *A63F 13/34* (2014.09); *G06F 3/165* (2013.01); *G10L 25/57* (2013.01); *H04N 7/04* (2013.01); *H04N 7/155* (2013.01); *H04N 7/157* (2013.01)

(58) Field of Classification Search
CPC ........... A63F 13/34; G06F 3/165; H04N 7/04; H04N 7/155; H04N 7/157
See application file for complete search history.

(56) References Cited

U.S. PATENT DOCUMENTS

| | | | |
|---|---|---|---|
| 10,737,180 B1 * | 8/2020 | Noland | A63F 13/847 |
| 11,065,546 B1 * | 7/2021 | Lange | A63F 13/34 |
| 2004/0179554 A1 | 9/2004 | Tsao | |
| 2007/0188502 A1 | 8/2007 | Bishop | |
| 2008/0263010 A1 | 10/2008 | Roychoudhuri et al. | |
| 2009/0318219 A1 * | 12/2009 | Koustas | G07F 17/3286 463/23 |

(Continued)

OTHER PUBLICATIONS

Written Opinion and International Search Report issued in corresponding PCT/US2019/019203 dated Aug. 29, 20219.

*Primary Examiner* — Steve Rowland
(74) *Attorney, Agent, or Firm* — Van Pelt, Yi & James LLP

(57) ABSTRACT

A peer to peer communication system and method are provided to enable interfacing with an application running on a gaming engine for an avatar simulation or video conference. The system and method establish a real-time peer-to-peer communication link between remotely located users for transmission in real-time of audio, video, and data communications. The system and method capture incoming audio and video transmissions from input devices operable by the users while controlling one or more avatars, and transmit, in real time, synchronized audio, video, and data communications to the users over the communication link.

18 Claims, 16 Drawing Sheets

(56) References Cited

U.S. PATENT DOCUMENTS

| | | | |
|---|---|---|---|
| 2011/0307807 A1* | 12/2011 | Norby | A63F 13/87 |
| | | | 715/758 |
| 2011/0312424 A1* | 12/2011 | Burckart | H04N 21/4781 |
| | | | 709/204 |
| 2013/0147904 A1* | 6/2013 | Vivekanandan, | G06T 11/00 |
| | | | 348/E7.083 |
| 2013/0265378 A1 | 10/2013 | Abuan et al. | |
| 2014/0364209 A1 | 12/2014 | Perry | |
| 2016/0253866 A1* | 9/2016 | Paradise | H04L 67/104 |
| | | | 463/25 |
| 2017/0165569 A1* | 6/2017 | van Welzen | H04N 7/147 |
| 2017/0237708 A1 | 8/2017 | Klaghofer et al. | |
| 2020/0139237 A1* | 5/2020 | Butler | A63F 13/355 |
| 2021/0370167 A1* | 12/2021 | Robinson | A63F 13/655 |

* cited by examiner

Start Up Process

Connection Establishment

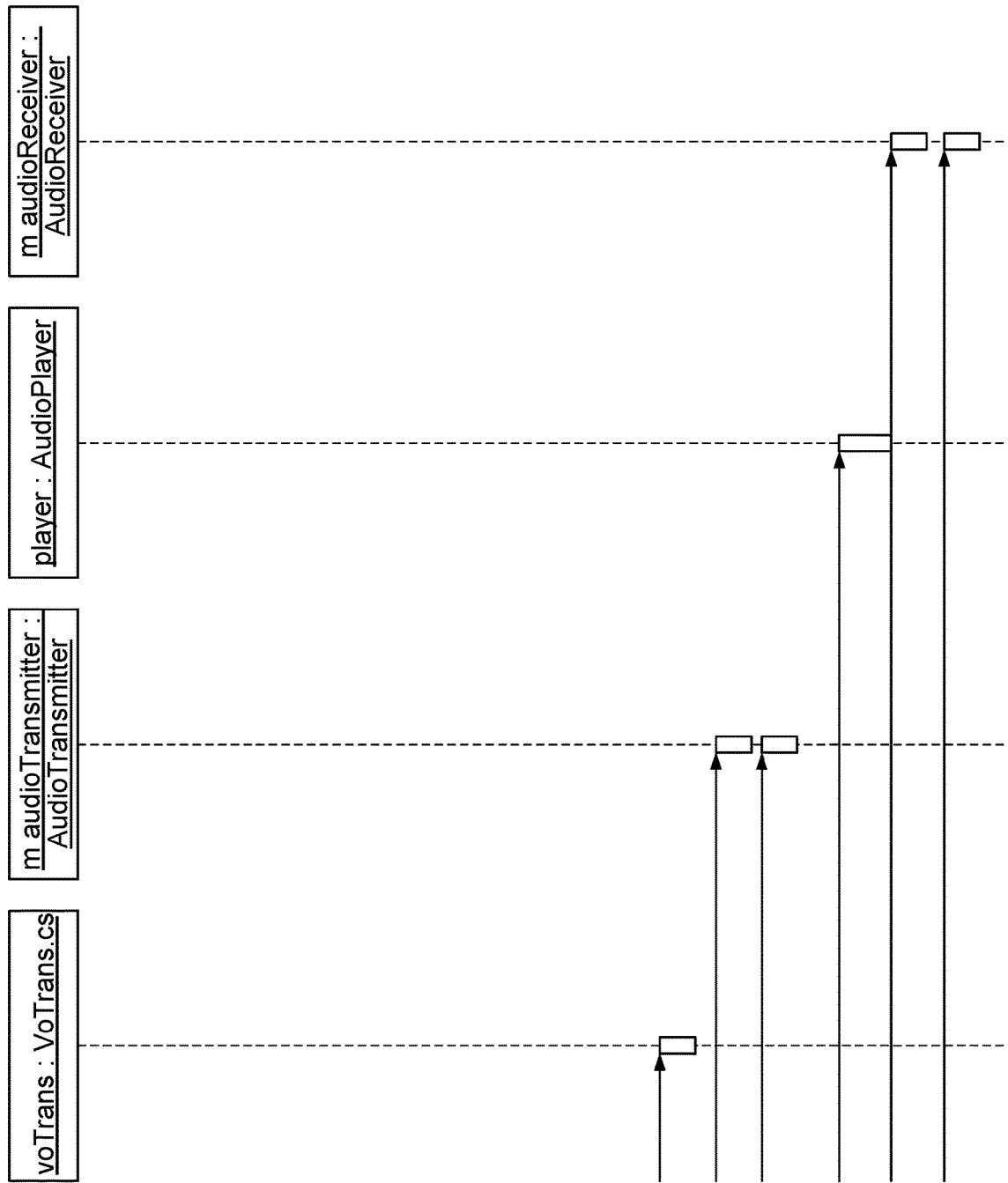
(continued from previous sheet)
FIG. 3 continued

Creating and Deleting a Session

Joining an Empty Room

Joining a Non-Empty Room

FIG. 7  Waiting Connection Within Room or When Someone Connects to the Current Room Common Audio Recording Processes Sound Recording into Video File or RTMP Stream Device Changing on the Fly During Active Voice Morphing Process Switching Webcam on the Fly During the Call

PEER TO PEER COMMUNICATION SYSTEM AND METHOD

CROSS REFERENCE TO RELATED APPLICATIONS

This application is a National Stage Entry of International Patent Application No.: PCT/US2019/019203, filed Feb. 22, 2019. The disclosure of which is expressly incorporated herein in its entirety by reference.

STATEMENT REGARDING FEDERALLY SPONSORED RESEARCH OR DEVELOPMENT

N/A

BACKGROUND

Avatar-based simulation systems and video conferencing systems are known that employ user-controlled avatars or other graphically generated characters. Such systems require the establishment of a video and audio connection between remotely-located users.

SUMMARY

A peer-to-peer communication system for avatar-based simulation systems or video conferencing systems is provided. The communication system provides for the establishment of a video and audio connection between users located remotely from each other.

More particularly, the system can interface with an application running on a gaming engine to enable a first user in a session to control one or more avatars generated by the gaming engine application. The system can establish a real-time peer-to-peer communication link between the first user and one or more additional users located remotely from the first user for transmission in real-time of audio, video, and data communications. An incoming audio transmission and an incoming video transmission can be captured from input devices operable by the first user. The system can transmit, in real time, synchronized audio, video, and data communications to the one or more additional users over the communication link.

DESCRIPTION OF THE DRAWINGS

Reference is made to the following detailed description taken in conjunction with the accompanying drawings in which.

DETAILED DESCRIPTION

Figure 1A:
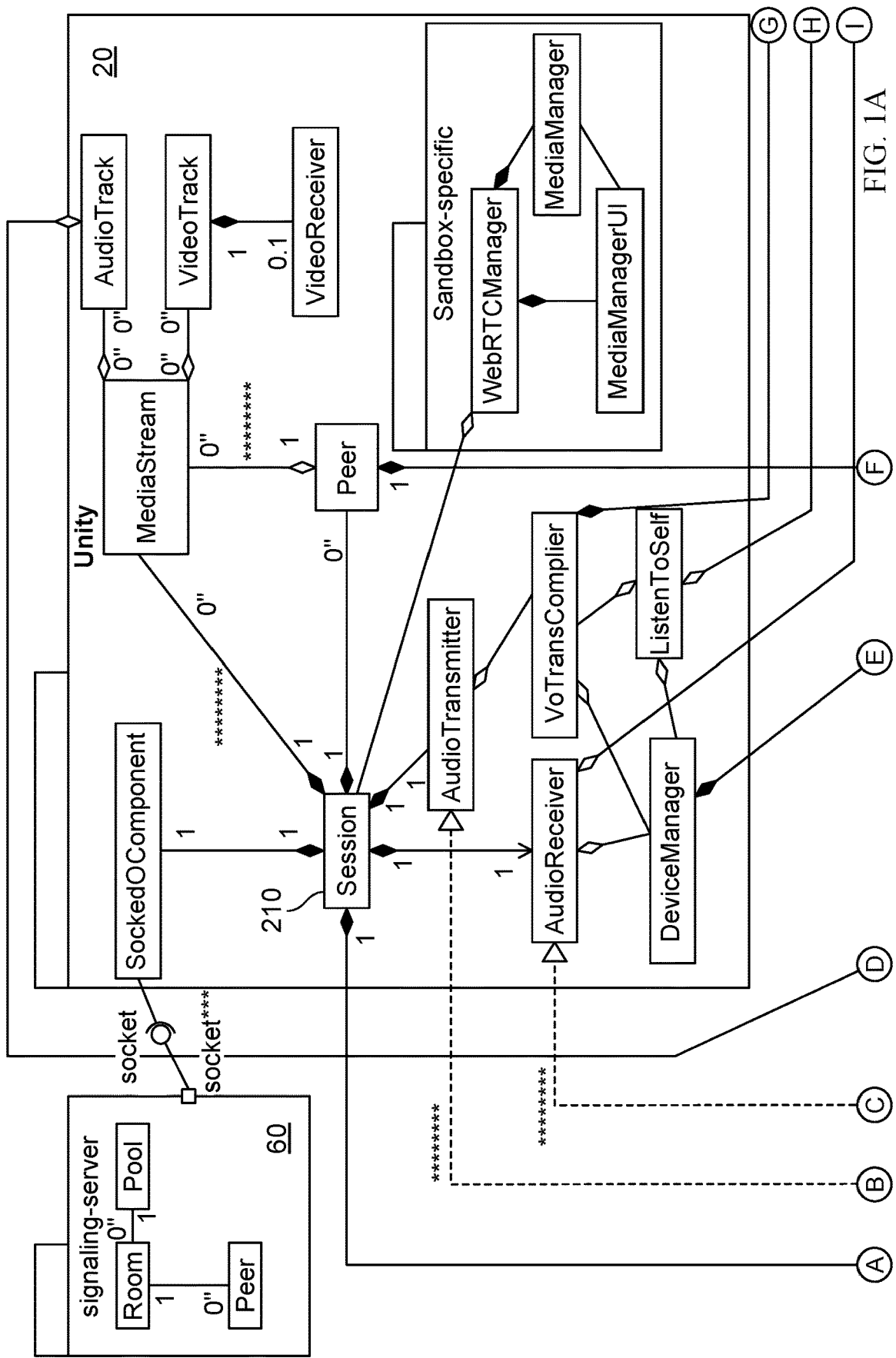
FIG. 1A is a schematic diagram of an embodiment of a high-level architecture of a peer to peer communication system.
Figure 1A:
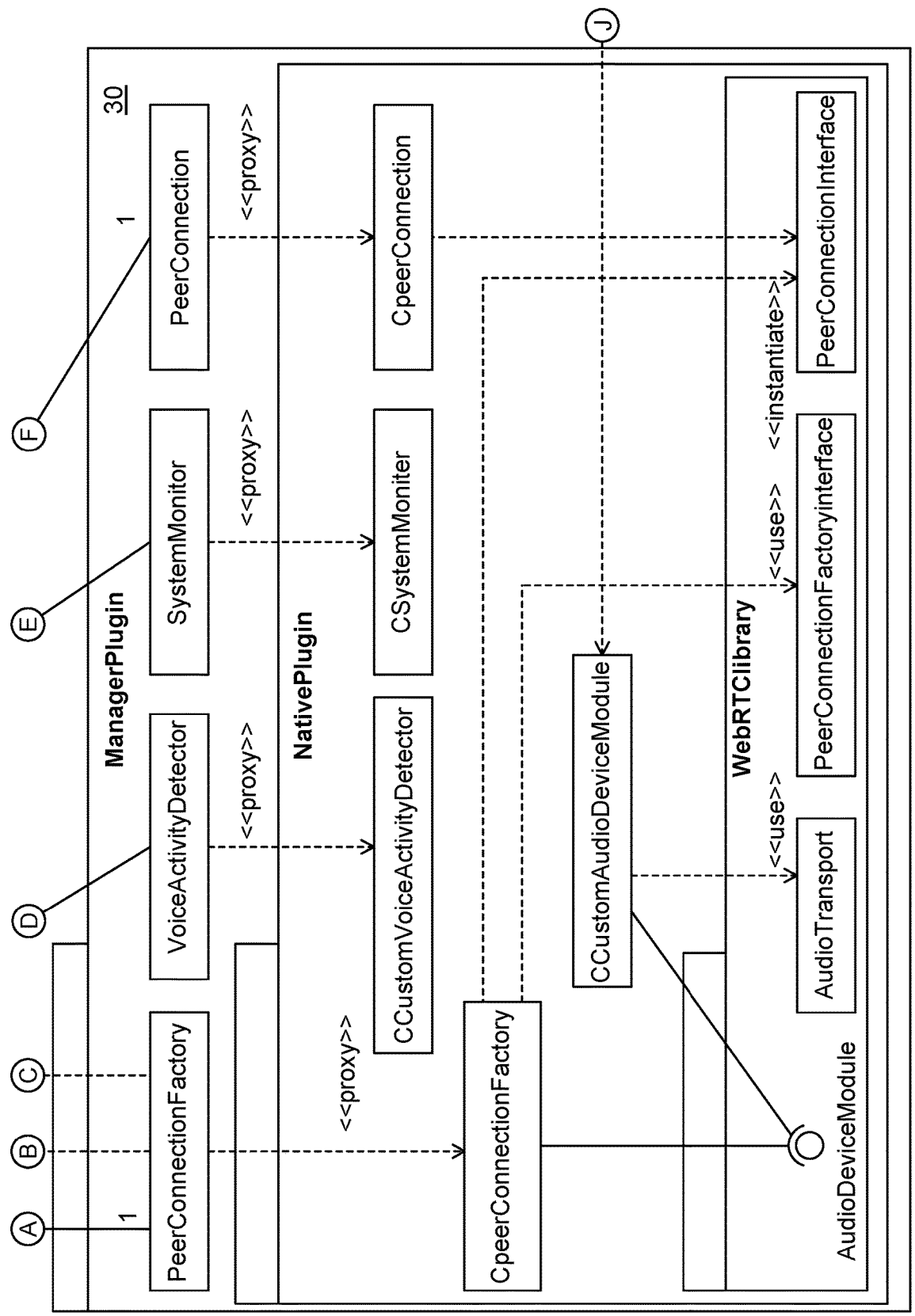
Figure 1A:
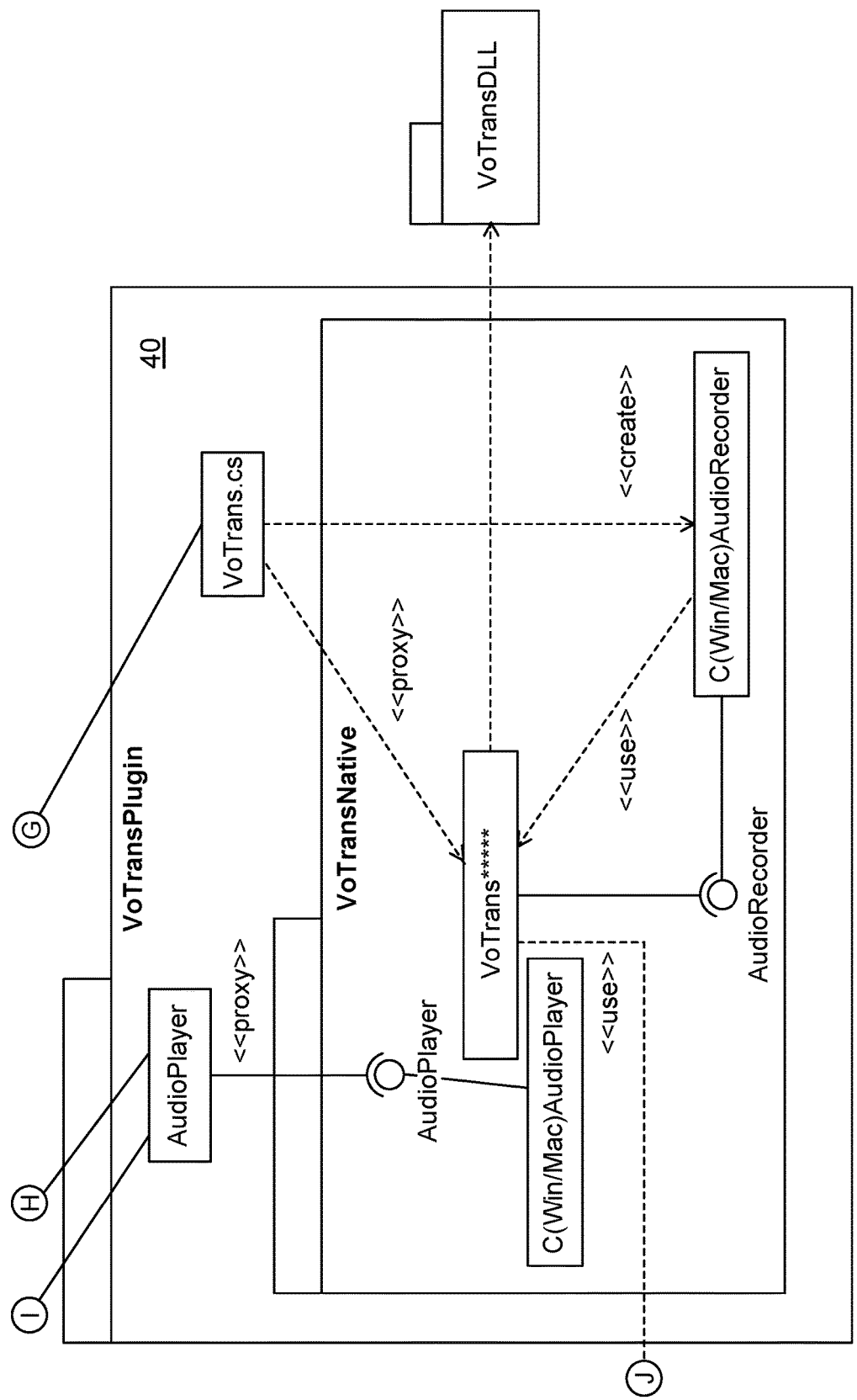

A peer to peer communication system is provided having an application architecture that allows real-time audio and video communications between multiple peers (people or users), for use with systems such as avatar-based simulation systems or video conferencing systems that employ user-controlled avatars. (See FIG. 1C.) Such systems can employ a gaming engine for the generation and control of the avatars. The gaming engine provides a software framework that allows interaction between people and/or game elements including video and typically includes a rendering engine to generate two-dimensional or three-dimensional graphics, such as animations, a physics engine to implement real world physical laws, for example to manage collisions between objects, and an audio engine to generate sounds.

In a simulation or conferencing system, each user operates a computing device that includes various functions to enable the user to connect to and interact with other users during a session. Each user can operate at least one input device, which allows the user to, among other functions, control an avatar. Each user is also provided with one or more display or other output devices, for example, to allow the users to see their own avatars and the avatars operated by the other users of the simulation or conferencing system, and to hear any audio transmissions from the other users, which may be associated with the users' avatars.

The communication system employs a gaming engine or virtual reality engine, and a web-based or browser-based real-time communication protocol, such as WebRTC, which is an open source, web-based real-time communication protocol employing a set of application programming interfaces to allow audio and video communication within web pages via peer-to-peer communication. The architecture of the present system can bridge the gap between stand-alone architecture and web-based architecture via a plugin interface allowing for the creation of conferencing type functionality within the gaming engine. Embodiments of the architecture are described herein with reference to the Unity3D gaming engine and the WebRTC protocol; however, the architecture can be adapted to embed a real-time communication protocol into any standalone application, compatible across different operating systems, such as the Windows and MacOS operating systems. Embodiments of the architecture can also allow cross-platform communication, for example, between Windows and MacOS platforms.

The communication system can create a network layer within the gaming engine that can be used to transport audio packets, video packets and data packets all simultaneously between two peers. That is, a single architecture can be responsible for networking between two instances of the program. This helps keep the latency and network parameters a constant within the application. This is advantageous compared to running the communication protocol (WebRTC) via a browser and the core gaming application (Unity3D application) as a stand-alone application, and managing them using managed threads, which can result in varying latencies between the two and cause a degraded experience for the users.

The architecture can use signal processing algorithms to modulate (alter) the voice of a speaker before transmitting it over the network. The morphed (modulated) voice is transmitted over the network in chunks, as they are processed, allowing for real-time morphing of a user's voice within the single application in the gaming engine.

The communication system can facilitate measurement of the time of speech of each peer (person) in the session (for example, a video conference or a simulation). In some embodiments, this can be built upon a WebRTC algorithm called VAD (Voice Activity Detection). This data can be used to derive and provide performance analytics to the end-user. Since a single network layer is used to transmit all packets, synchronization of the audio, video and data streams can be taken care of inherently. The data streams can be used to carry the signals to control the avatars in a simulation via the gaming engine. This data is therefore already processed and available readily for use by the users of the avatar simulation system. This data also lends itself readily to other such data analysis.

The communication system can include a feature that allows real-time recording of the audio and video streams within the gaming engine application. In some embodiments, this can be built using the FFMPEG library and integrated as a plugin inside the gaming engine. The system can support both writing of the recorded audio and video directly to a cloud-based server as well as streaming, for example, via the RTMP protocol, allowing users to view the communications between peers in real-time. The video and audio that is recorded can also be stored locally, which allows a simulation or other session to be captured and provided back to the users for review. In addition, this captured audio and video data can be used for the purposes of analytics.

In some embodiments, the communication system can implement streaming of audio data after performing real-time voice morphing at the driver level. In some embodiments, the communication system can capture audio and video streams from a hardware device on an independent thread and pass that data into the gaming engine, for example, via a plug-in interface, which can be built using WebRTC.

Figure 1B:
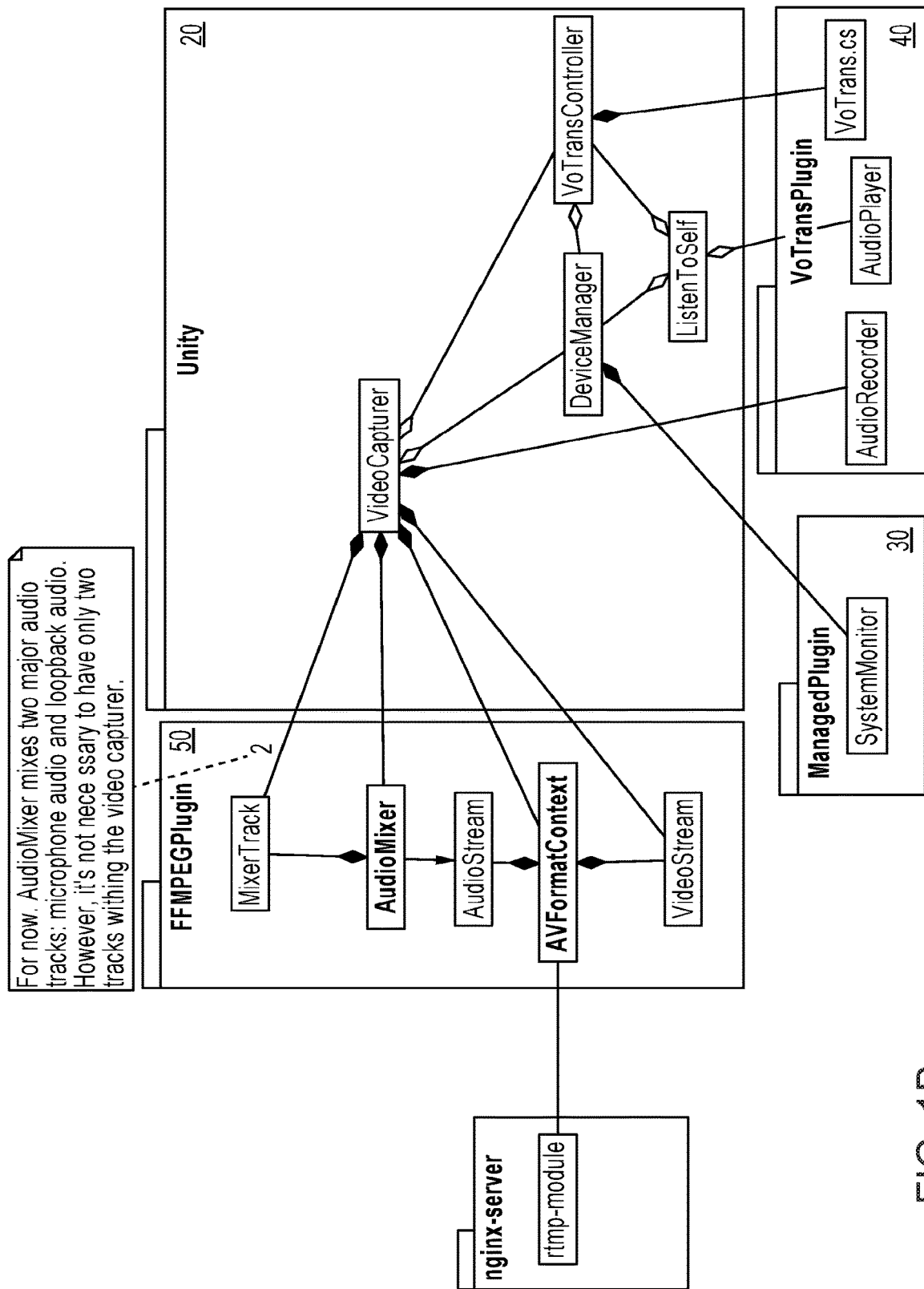
FIG. 1B is a further schematic diagram of a high-level architecture of a peer to peer communication system.
Figure 1C:
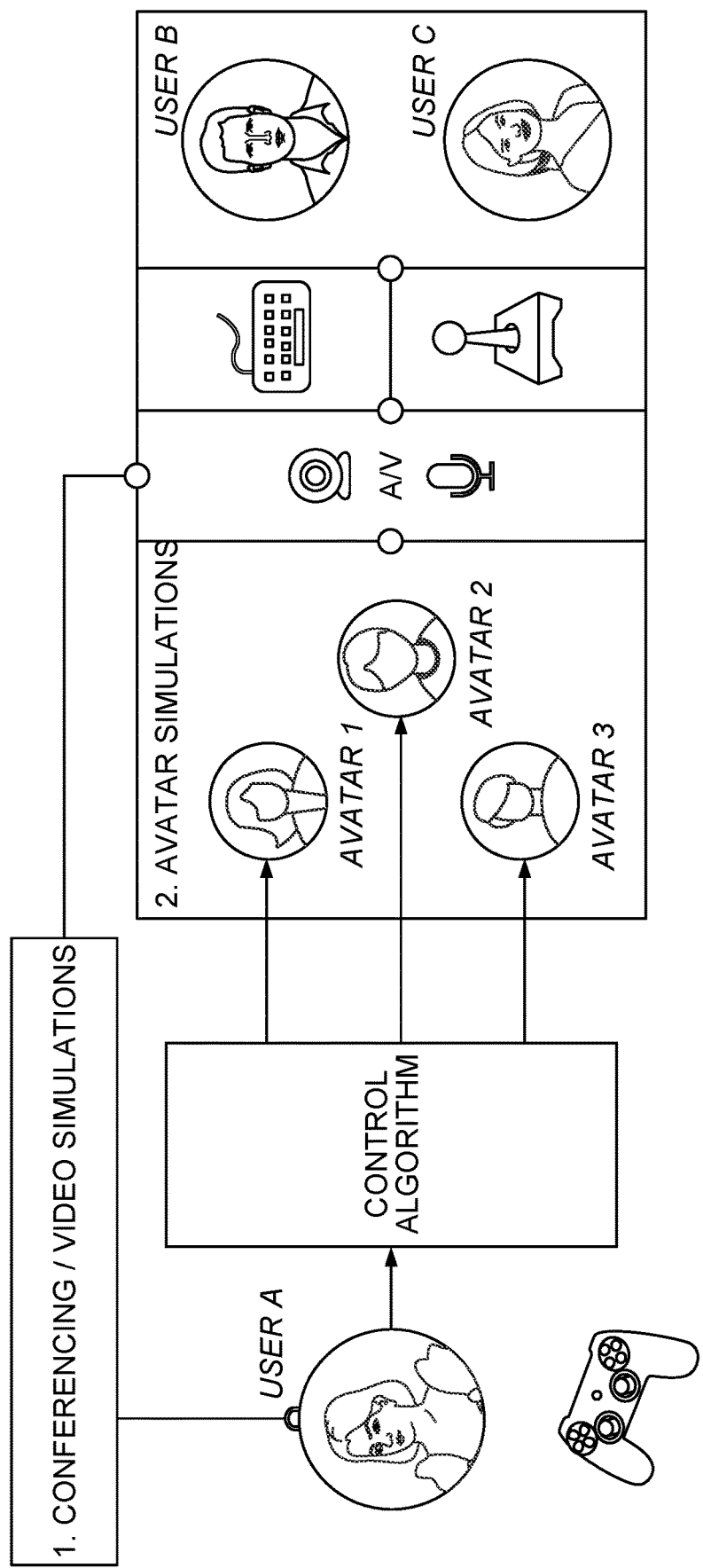
FIG. 1C is a schematic illustration of a video conferencing or avatar simulation system employing embodiments of the peer-to-peer communication system.

FIGS. 1A and 1B provide schematic diagrams of an embodiment of a high-level architecture of the communication system. In some embodiments, the communication system can be implemented using software modules or components embodied on a machine-readable medium. The modules can be added as external software, such as a plug-in, to a gaming engine (as described in the embodiments below), can be implemented directly within a gaming engine, or a combination thereof.

A module 20 (termed "Gaming/Rendering Engine") is provided to communicate with and manage the other components. An interface module 30 (termed "ManagedPlugin") can be provided to manage the interface between WebRTC and the Gaming/Rendering Engine. An audio module 40 (termed "VoTransPlugin") can be provided to manage the audio transmissions. An audio and video mixing module 50 (termed "VideoRecordingPlugin") can be provided to manage the mixing of multiple audio tracks and the recording of audio and video streams.

Referring to FIG. 1, a signal server 60 can be used to set up communications between peers or participants using an avatar simulation system or video conferencing system. The Gaming/Rendering Engine module includes an object, termed "Session," that communicates to other participants through the signaling server using a bi-directional, event-driven, real-time protocol, for example, the socket.io protocol. Session also creates and manages WebRTC's PeerConnections, initializes them, and puts asynchronous WebRTC's events into the event queue inside the Gaming/Rendering Engine. (Note that some engines allow working with their user interface (UI) components only within the Main Thread; working within the dedicated WebRTC thread causes exceptions.) Various Other socket protocols and libraries can be used.

The Gaming/Rendering Engine can include a number of components. Peer class provides a functionality to enable communication with remote participants not only through PeerConnection, but also through the signaling server, by exchanging SDP (session description protocol) packets and ICE (interactive connectivity establishment) candidates.

Components termed "MediaStream," "AudioTrack," and "VideoTrack" are helper classes. They can help to instantiate corresponding low-level objects not accessing the class PeerConnectionFactory directly. AudioTrack can also include a Voice Activity Detection feature and the ability to get remote audio data.

A component termed "VideoReceiver" can help to render incoming video feed into a User Interface display component layer of the Gaming/Rendering Engine or application.

A component termed "AudioReceiver" can receive mixed audio from all remote participants simultaneously by accessing CPeerConnectionFactory→CCustomAudioDeviceModule. AudioReceiver redirects incoming audio feed into AudioPlayer.

A component termed "AudioTransmitter" transmits morphed sound to all participants simultaneously by accessing CPeerConnectionFactory→CCustomAudioDeviceModule.

A component termed "WebRTCManager" can be an entry point of the system. It can handle UI events (user interface events) and manipulate Session objects by a user's demand.

A component termed "DeviceManager" can rule all media devices, such as, without limitation, microphones, speakers, and webcams. It can list them by using WebRTC and VoTrans functions, detect device removal and arrival by using SystemMonitor component, and send an event when an active device has been changed.

A component termed "VoTransController" can wrap the VoTrans component to send a broadcast event to the WebRTC, FFMPEG and Listen-To-Self components, when the morphed sound is ready. In addition, it can store the current state. VoTransController can help when an active microphone has been changed and the VoTrans module should be re-initialized.

A component termed "MediaManager" can rule high-level video and audio tracks. It can be a sandbox-specific component. The sandbox can transmit one video track and one audio outgoing track over WebRTC. The Network Optimization Feature can be provided to manipulate only these two tracks on the local side.

A component termed "VideoCapturer" can combine the RenderTexture image from a gaming engine's UI, VoTransController sound and AudioRecorder loopback sound into a single video file or RTMP stream.

The interface module 30, ManagedPlugin, provides several classes. A class termed "PeerConnectionFactory" can instantiate PeerConnections and media streams and provide morphed audio transmitting functionality. A class termed "PeerConnection" can provide direct connection to remote participants. A class termed "SystemMonitor" can emit events when a video or audio device is plugged or unplugged. A class termed "VoiceActivityDetector" can facilitate measurement of the time of speech of each peer in a session.

WebRTC's C++ code is not compatible with Microsoft C++/CLI environment, so WebRTC's C++ classes cannot be used directly within the gaming engine component used with a gaming engine such as the Unity3D gaming engine. Thus, ManagedPlugin includes an independent and autonomous NativePlugin.dll, which includes the whole WebRTC library and provides C-like functions to rule it. Almost all these C-like functions accept some handle, which is just an integer value. These handles are associated with low-level WebRTC's objects. While this approach allows using C++ objects inside C# code, this is not convenient. Thus, for high-level development convenience, the plug-in, termed ManagedPlugin, is provided. This C# class library refers to low-level NativePlugin.dll, exports C-like functions using .NET Interop interoperability services and P/Invoke (platform invocation) mechanisms and provides C# classes by wrapping these C-like functions. ManagedPlugin can provide additional C# and C++ interoperability such as delegates and/or lambdas passing into C++ code and correct garbage collection management. The same development approach can be applied to VoTransNative, VoTransPlugin, NativeFFMPEG, and VideoRecordingPlugin DLL libraries.

The audio module 40, VoTransPlugin, provides two classes. A class termed "AudioPlayer" can play back custom audio on demand by an operating system. A class termed "VoTrans" can directly capture an audio from a specified device, morph the sound, and call OnFinalAudioCallbackUnmanaged delegate when a portion of the morphed sound is ready.

The audio and video mixing module 50, VideoRecordingPlugin, can provide for the creation of a video and audio recording of a simulation or other session. The module can provide real time recording of the audio and video streams. This module includes a component termed AudioMixer that can mix two or more audio tracks, such as audio input from a microphone and loopback audio. VideoRecordingPlugin can provide for the real time recording of audio and video streams. In some embodiments, the module can employ the FFmpeg opensource tools and library. The components of VideoRecordingPlugin can be linked to the VideoCapturer component of the main module, Gaming/Rendering Engine.

VideoRecordingPlugin can utilize the struct "AVFormatContext" from the FFmpeg library, which can be in communication with a web server for writing packets of the recorded audio and video to another computer system or server, for example, a cloud-based server. The component can provide streaming of the recorded audio and video via the RTMP protocol to allow users to view the communication between peers in real time. The recorded video and audio can also be stored locally.

By capturing and storing a simulation or other session, the sessions can be made available to users for subsequent review. The captured audio and video data can also be used for data analysis.

Figure 2:
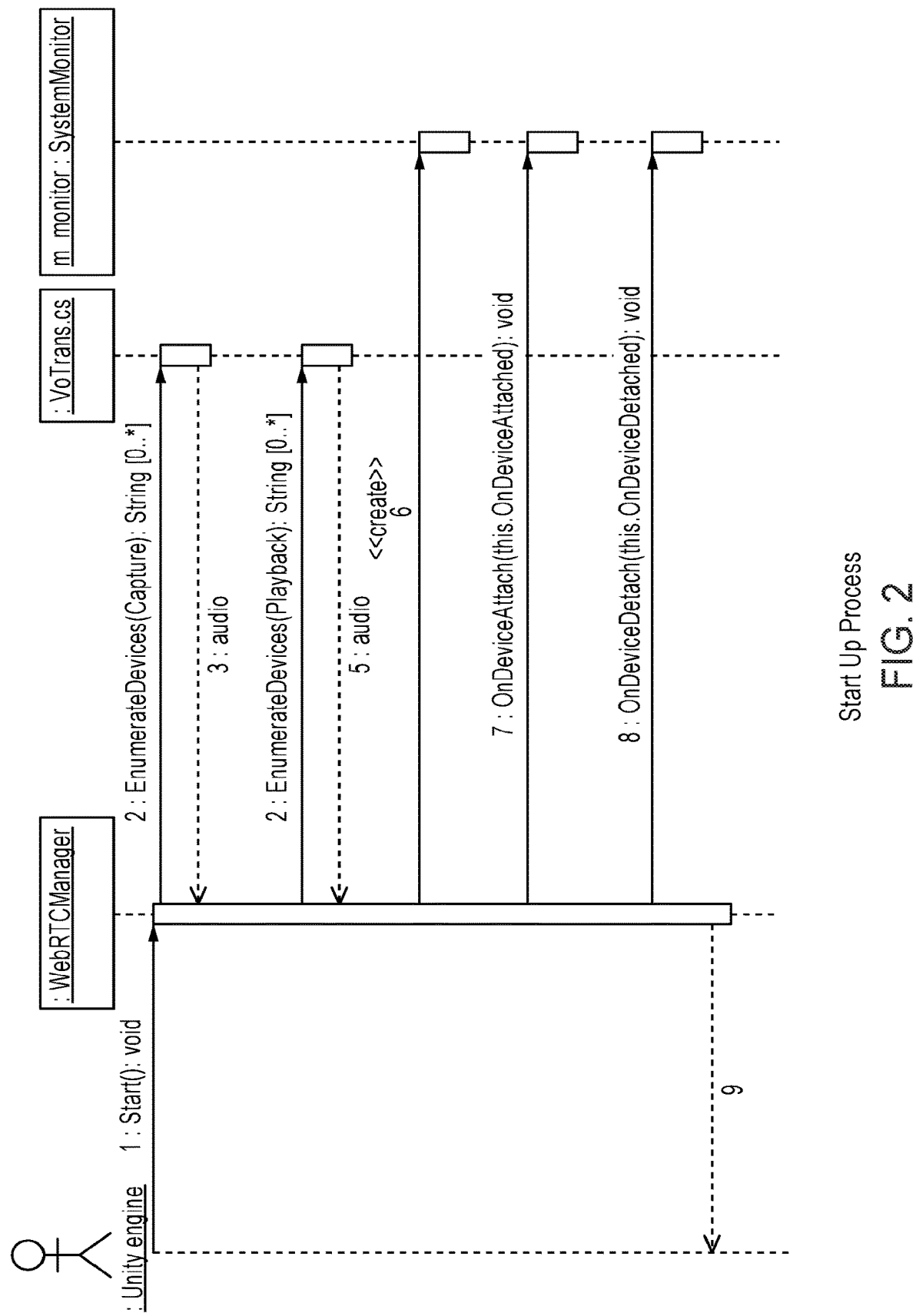
FIG. 2 is a schematic sequence diagram of a process of starting up a communication application.

In some embodiments, operation of the system can be described as follows:

FIG. 2 illustrates a sequence diagram illustrating an embodiment of a startup process. When a user starts the communication application, management of any system devices also occurs. Any audio and video devices are enumerated. FIG. 2 illustrates enumeration of an audio capture device and an audio playback device. It will be appreciated that other devices can be similarly managed. A list of all enumerated devices can be provided to a user interface, for example, in a dropdown list (not shown). The WebRTCManager creates a SystemMonitor object and subscribes on its events. In this manner, the status of any connected devices can be monitored during a session.

Figure 3:
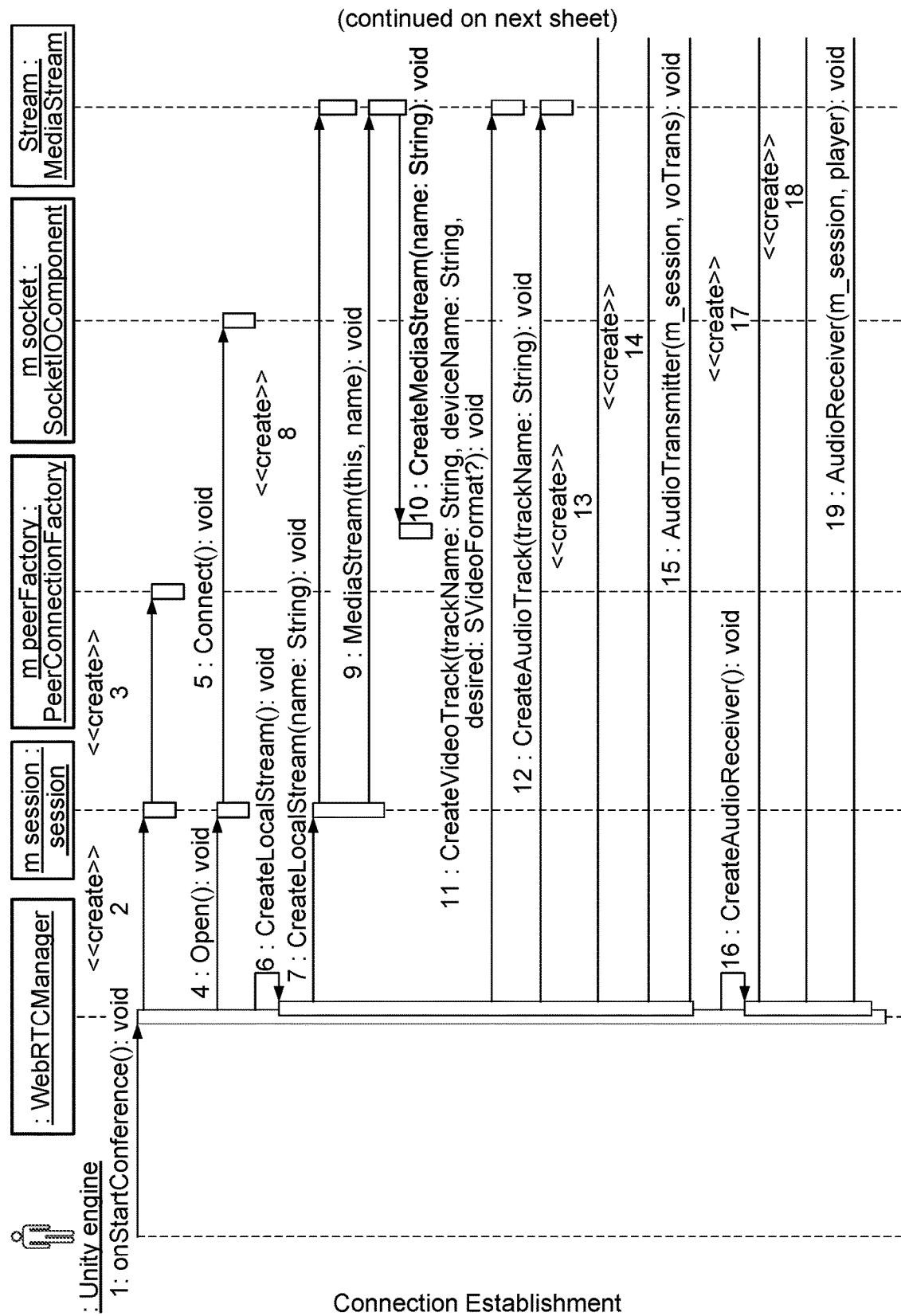
FIG. 3 is a schematic sequence diagram of a process of establishing a connection.
Figure 4:
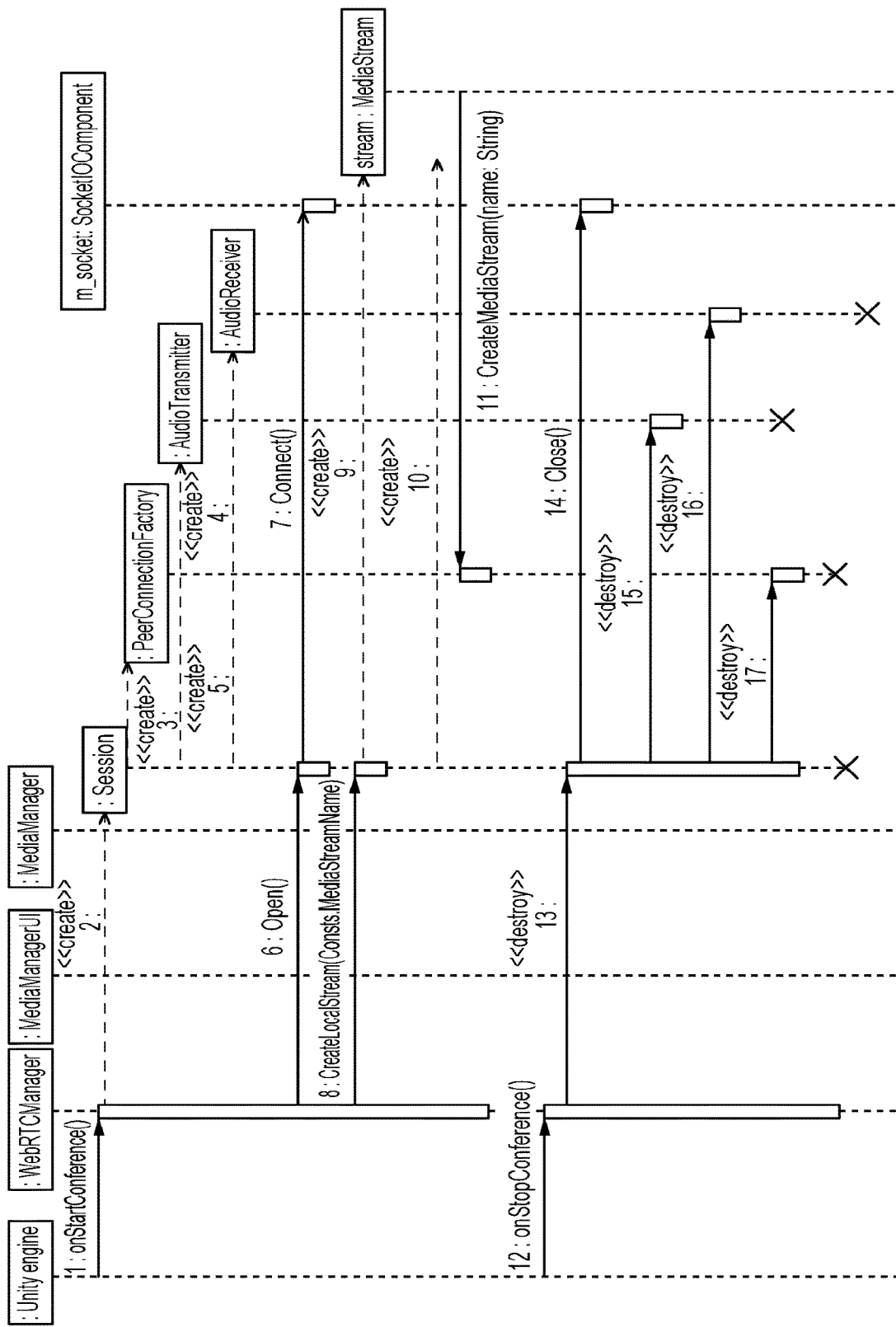
FIG. 4 is a schematic sequence diagram of a process of creating and deleting a session.

Establishment of a connection can be further described with reference to FIG. 3. For example, a user can press a Join button. An event handler, termed onStartConference( ), sends a request to the WebRTCManager object for the creation, initialization and linking together of various objects, including Session, PeerConnectionFactory, VoTrans, AudioTransmitter, AudioReceiver, AudioPlayer, and a local MediaStream. In some embodiments, the local MediaStream can be attached to the appearing PeerConnection objects and shares itself between them. The Session object can open the connection to a signal service socket, as described above. FIG. 4 illustrates a schematic of an embodiment of creating and then deleting a session, illustrating operations from FIG. 3 at a higher level.

Figure 5:
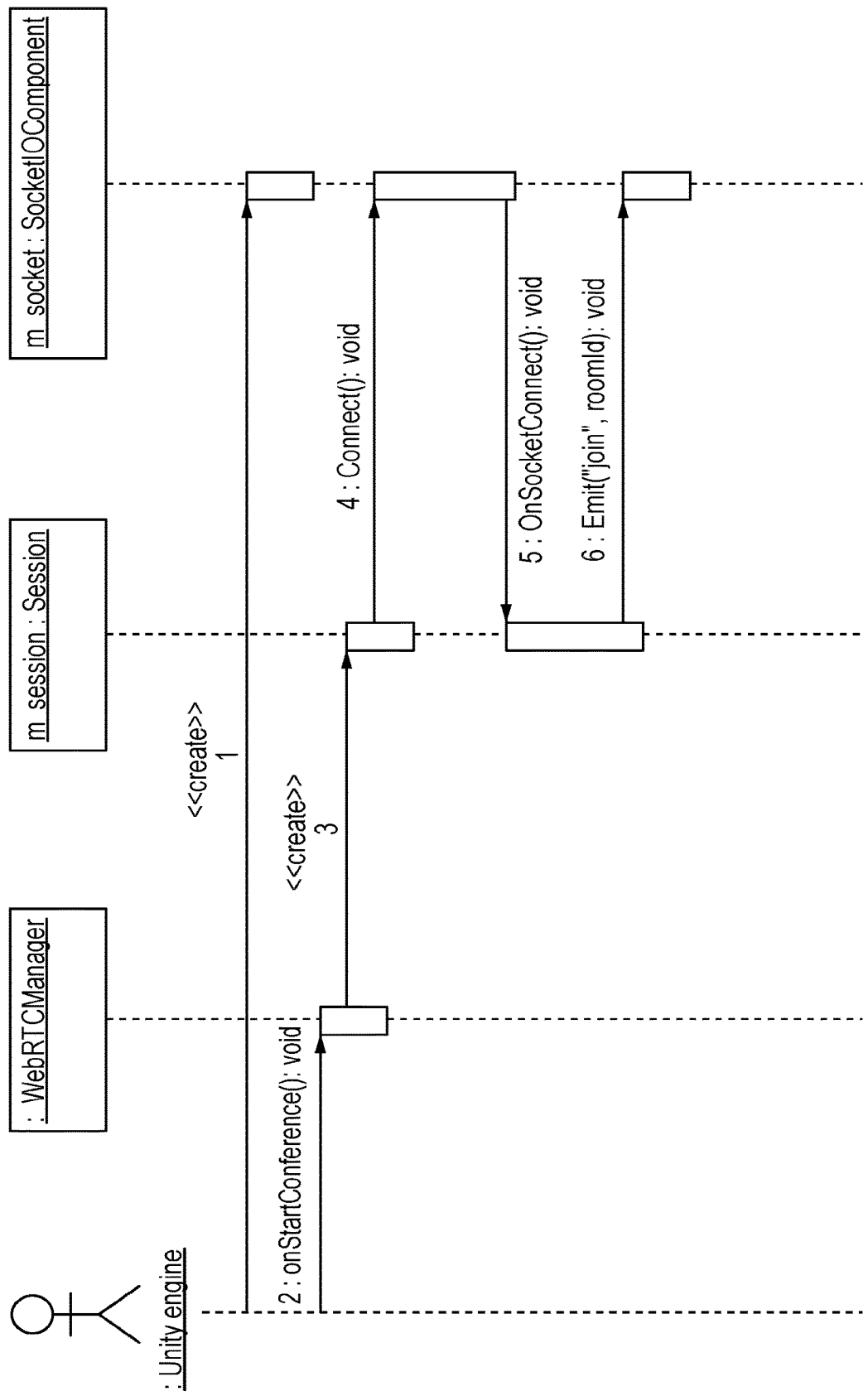
FIG. 5 is a schematic sequence diagram of high level interactions during a process of joining an empty room.
Figure 6:
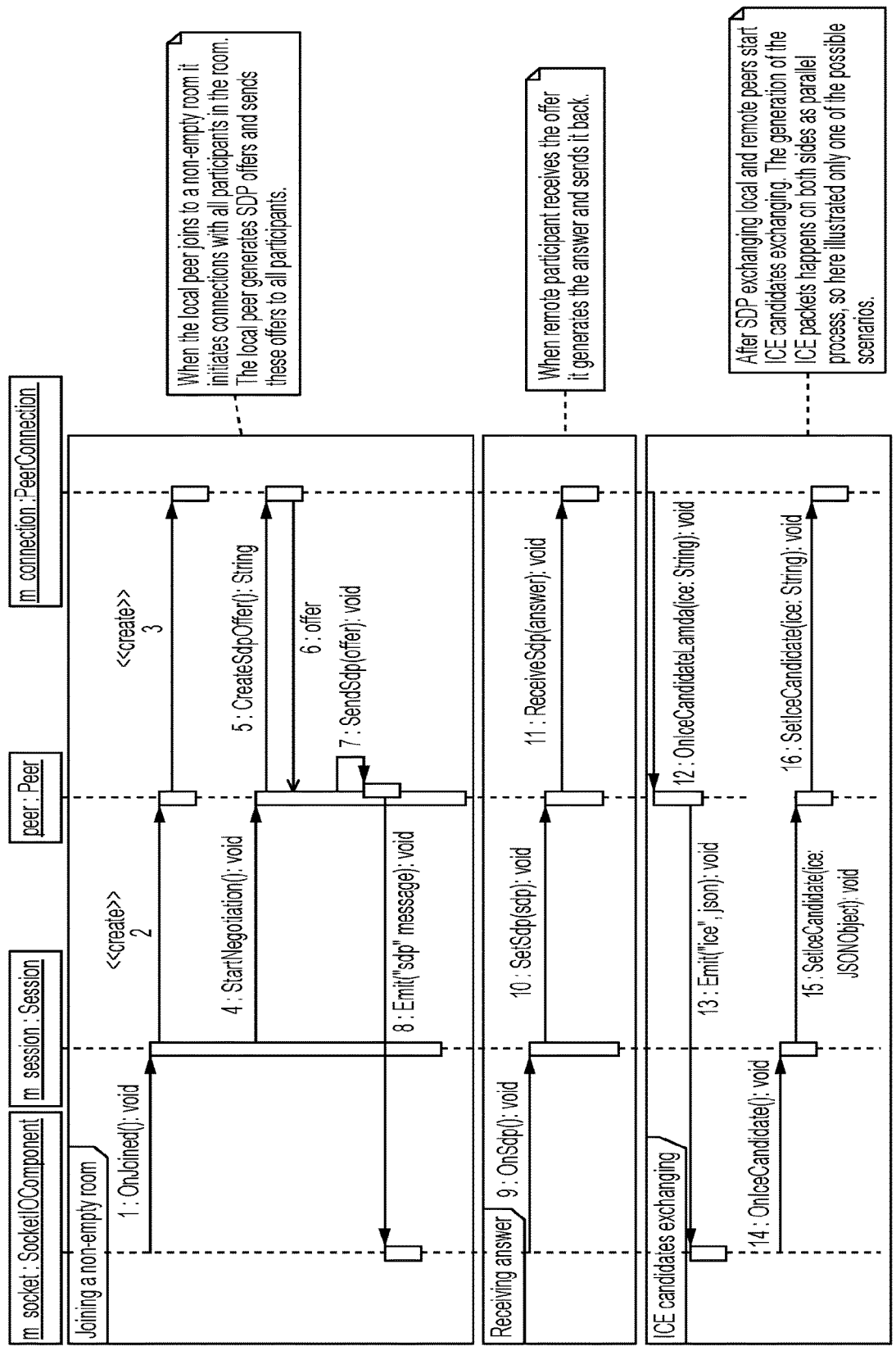
FIG. 6 is a schematic sequence diagram of high level interactions during a process of joining a non-empty room.

FIG. 5 illustrates an embodiment of high level interactions during a process of joining an empty room. The Session object can send a connection request to a signal server socket. FIG. 6 illustrates an embodiment of high level interactions during a process of joining a non-empty room. When a local peer joins a non-empty room, it initiates connections with all of the participants already in the room. The local peer generates SDP (session description protocol) offers and sends these offers to all the participants. When a remote participant receives the offer, it generates an answer and sends it back. After the SDP exchanges, the local and remote peers begin an exchange of ICE (interactive connectivity establishment) candidates. The generation of ICE packets happens on both sides as parallel processes. For simplicity, FIG. 6 only illustrates one of the possible scenarios.

Figure 7:
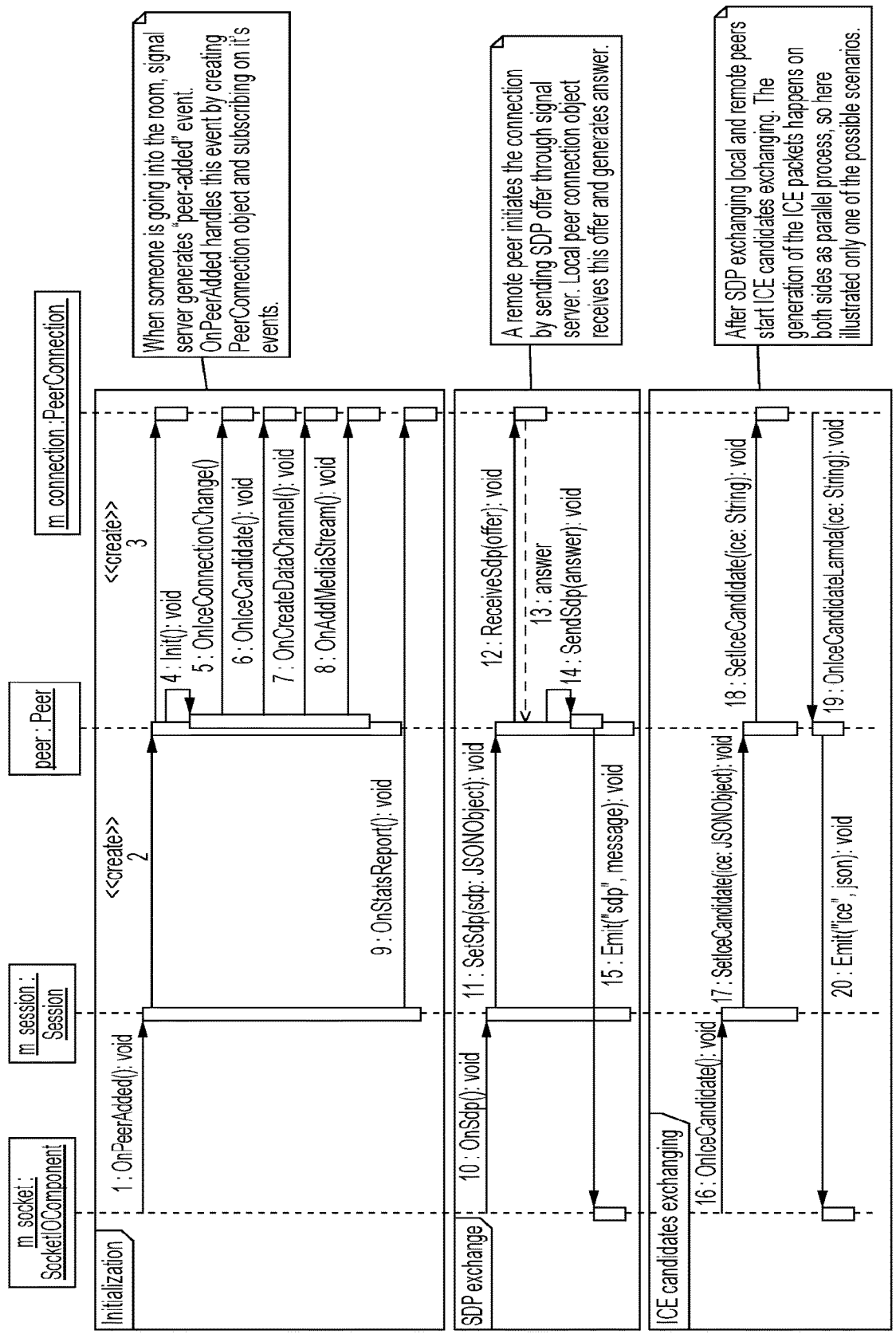
FIG. 7 is a schematic sequence diagram of high level interactions during a process of awaiting a connection within a room.

FIG. 7 illustrates high level interactions while awaiting a new connection within a room. When a peer enters the room, the signal server generates a "peer added" event. The OnPeerAdded handler handles this event by creating the Peer Connection object and subscribing on its events. A remote peer then initiates a connection by sending an SDP offer through the signal service. The local peer connection object receives this offer and generates an answer. After the SDP exchanges, the local and remote peers begin an exchange of ICE candidates. The generation of ICE packets happens on both sides as parallel processes. For simplicity, FIG. 7 only illustrates one of the possible scenarios.

The FFMPEG module can allow creation of a video file with multiple audio and video tracks. These tracks are independent. If the application writes loopback sound (for example, sound from the Gaming/Rendering Engine and WebRTC) and morphed voice into two different FFMPEG tracks, then a video player would see two different audio tracks on the recorded video. When playing a recording only one audio/video track can be played at once. Thus, AudioMixer component is implemented to manage this situation. The AudioMixer component mixes two separate sound streams as a single one and writes it into a FFMPEG audio stream. Therefore, morphed voice and loopback sound can be presented as a single audio track, for example, within mp4 or flv file (Flash video).

Figure 8:
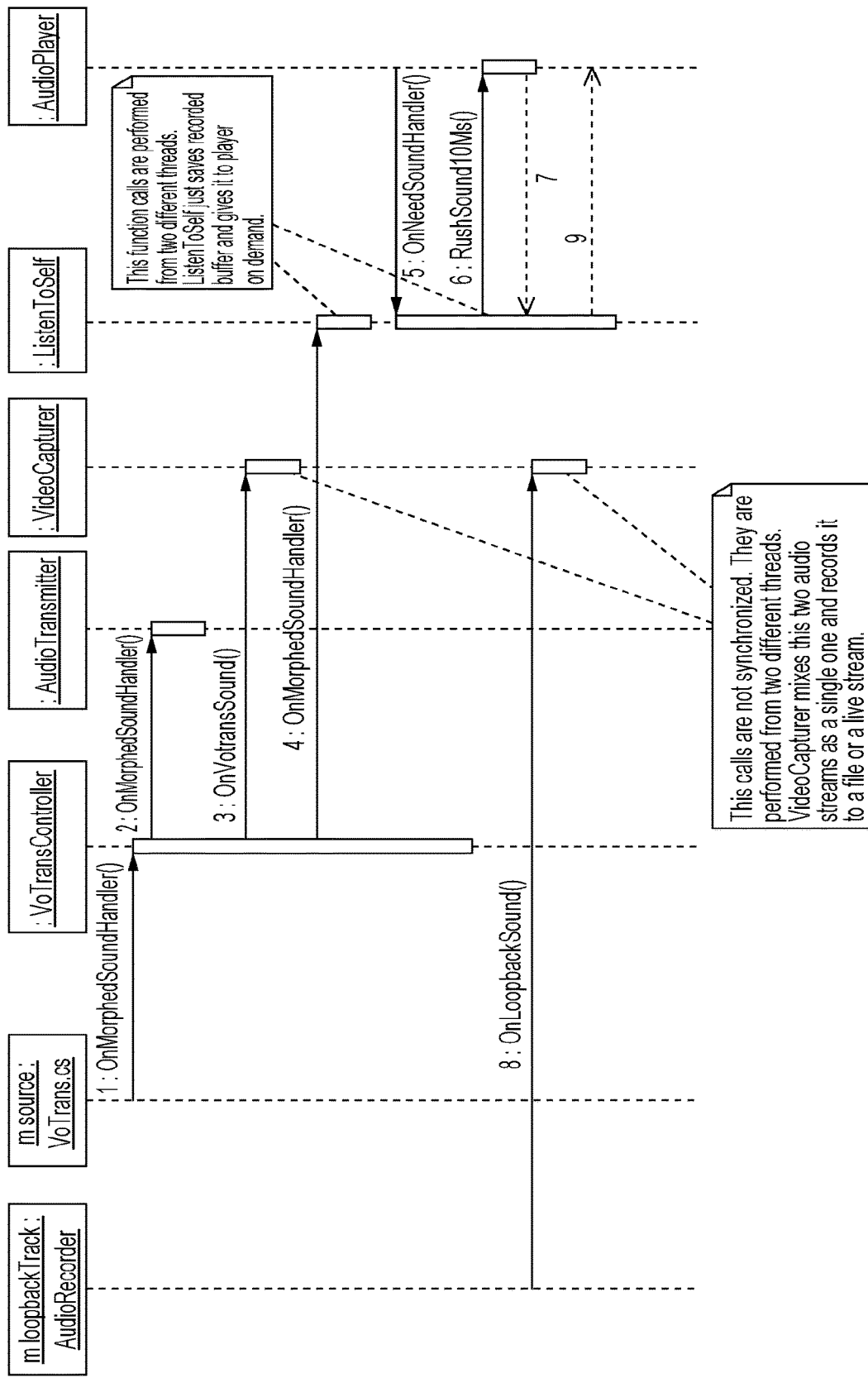
FIG. 8 is a schematic sequence diagram of a process of recording audio data.

Embodiments of audio recording processes can be described with reference to FIGS. 8 and 9. The audio processing mechanisms can be configured to satisfy FFMPEG requirements. FIG. 8 illustrates an embodiment of the processing of incoming microphone and loopback sounds and how their receipt by VideoCapturer (FFMPEG), AudioTransmitter (WebRTC) and AudioPlayer (Listen-To-Self).

The ListenToSelf object can save a recorded audio buffer and deliver it to an audio player on demand. Function calls to ListenToSelf can be performed from two different threads, e.g., from VoTransController in the Gaming/Rendering Engine module and AudioPlayer in the VoTrans module.

Functions calls to VideoCapturer can be performed from different threads, from VoTransController in the Gaming/Rendering Engine module for morphed or modulated input audio and from AudioRecorder in the VoTrans module for loopback sound. VideoCapturer can mix the two audio streams as a single stream and record it to a file or to a live stream.

Figure 9:
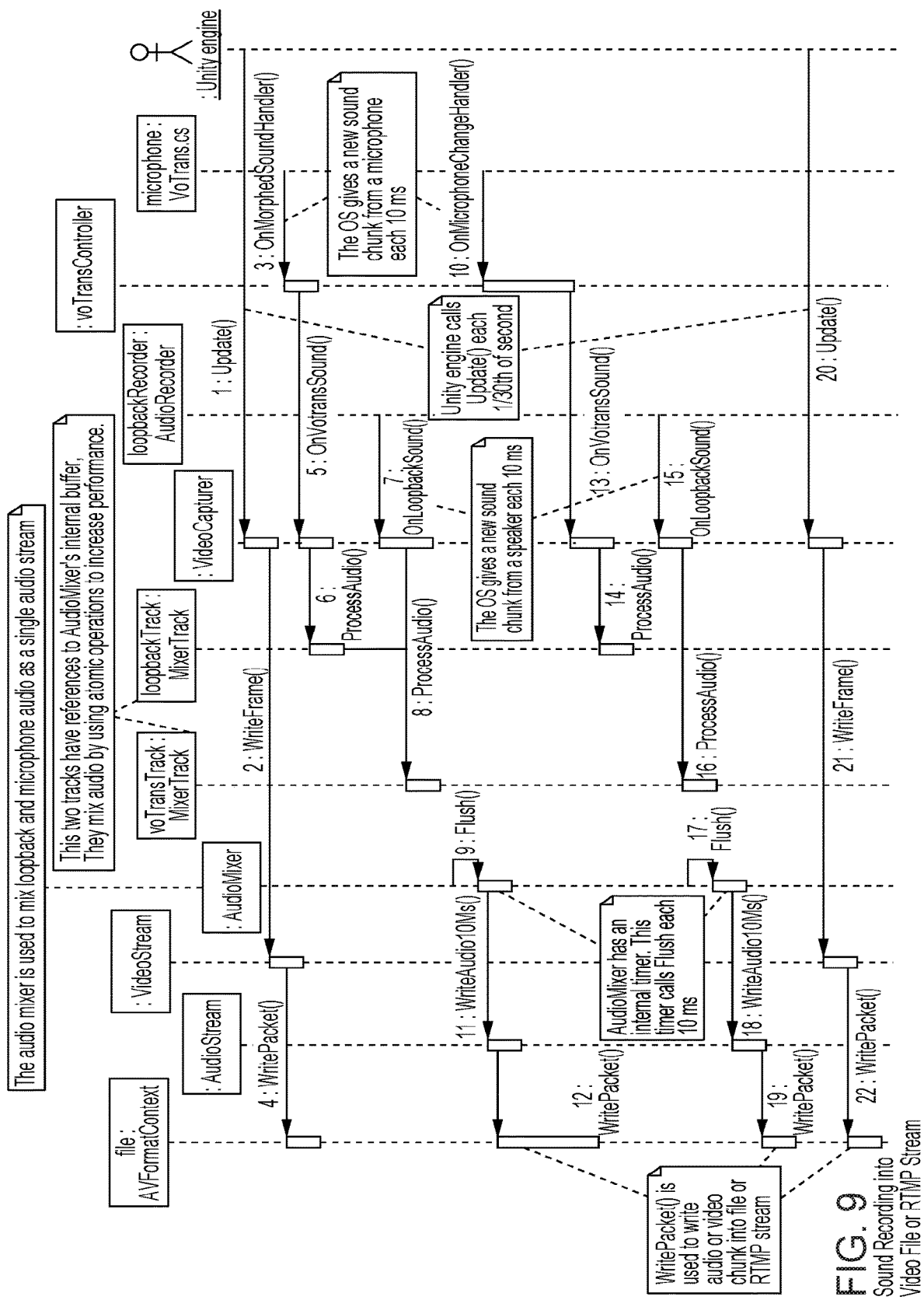
FIG. 9 is a schematic sequence diagram of a process of recording audio into a video file or RTMP stream.

FIG. 9 illustrates an embodiment of the processing of audio and video inputs into a video file with sound recording or into a live stream via RTMP using, for example AVFormatContext of the FFmpeg libraries. Sound and video chunks are transmitted at suitable periodic time intervals. For example, the operating system can provide a new sound chunk from a microphone every 10 ms and a new loopback sound chunk every 10 ms. The Gaming/Rendering Engine can call updates for the video input every 1/30 second. The audio mixer is used to mix the loopback and microphone audio as a single audio stream. Two mixer tracks one for microphone sound and one for loopback sound are provided, having references to an internal buffer of the AudioMixer component. They can mix audio by using atomic operations to increase performance. The AudioMixer component can include an internal timer to periodically flush the mixer and write the audio chunks to a file or RTMP stream, for example, every 10 ms.

Figure 10:
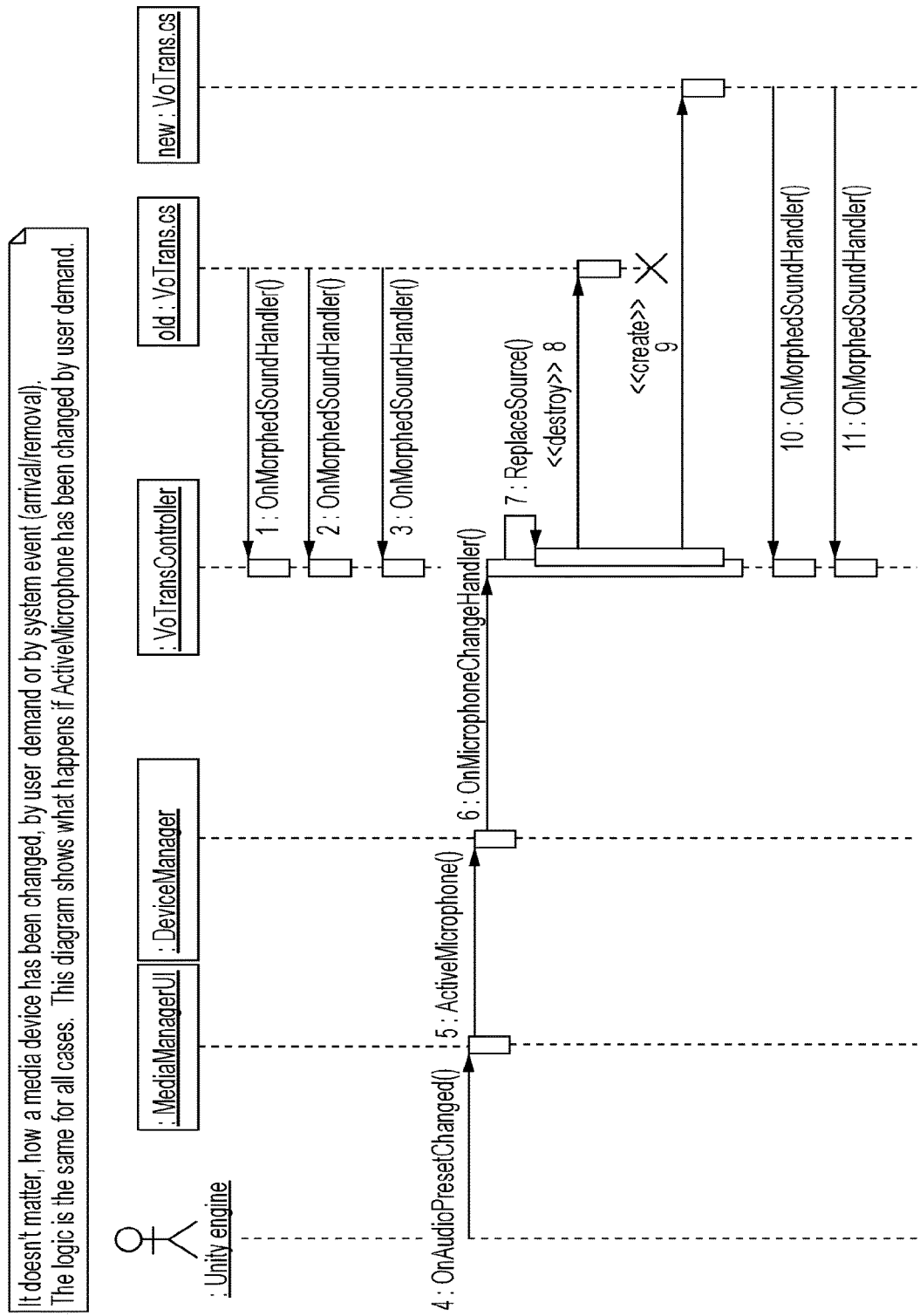
FIG. 10 is a schematic sequence diagram of a process of changing a device on the fly during an active voice morphing process.

Occasionally during an interaction, a user may switch a device, such as, without limitation, a microphone, speaker, loopback device, or webcam. Similarly, a system event may occur that calls for adding or removing a device. As mentioned above, a DeviceManager component can be implemented to manage device switching, arrival and removal. The DeviceManager component can contain objects or properties for managing the various devices. FIG. 10 is a schematic illustration of a process of a user changing a microphone on the fly during an active voice morphing process, using a property of DeviceManager termed ActiveMicrophone. The same logic can be applicable for playback and loopback device switching.

Figure 11:
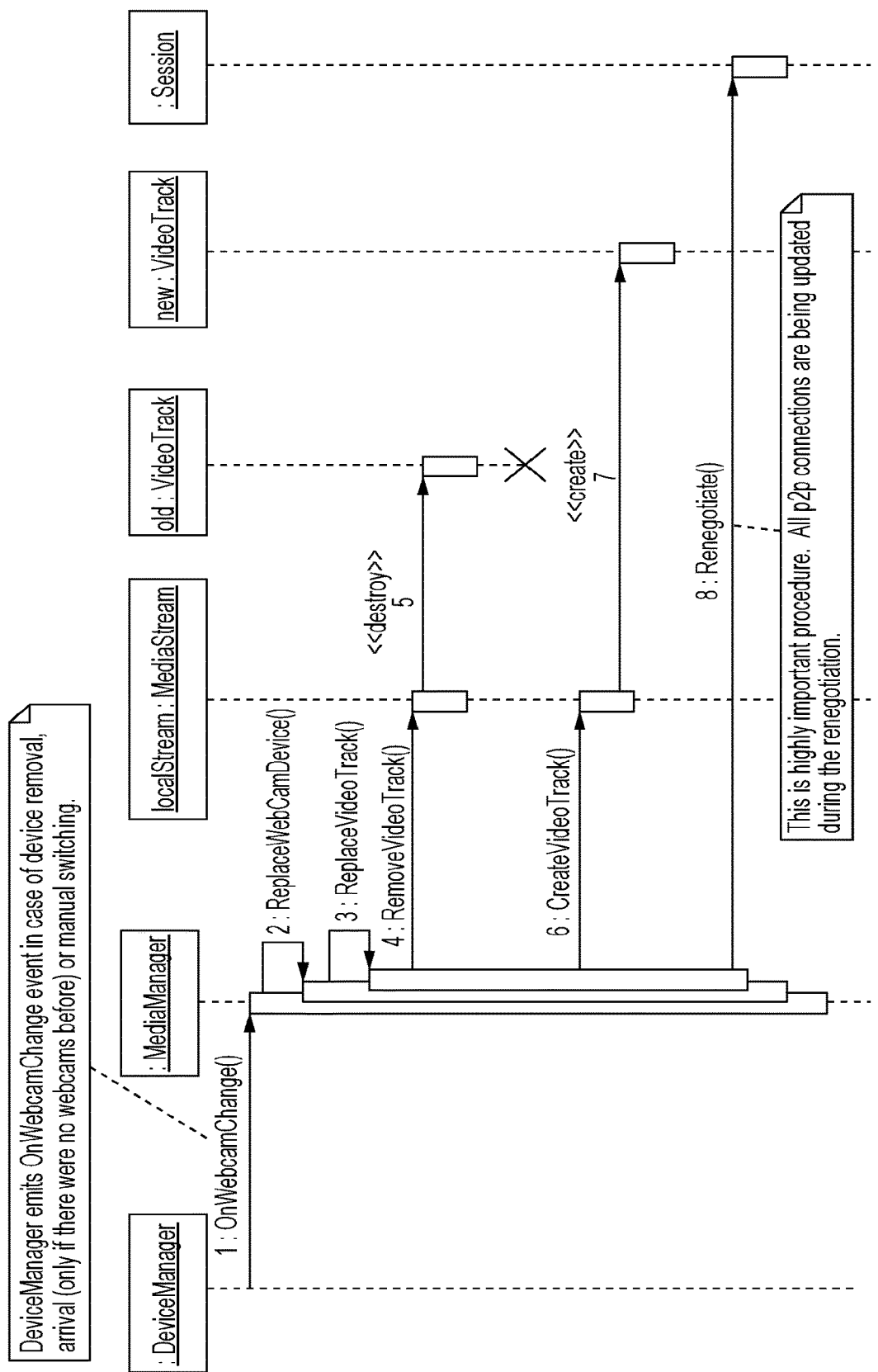
FIG. 11 is a schematic sequence diagram of a process of switching a webcam on the fly during a call.

FIG. 11 is a schematic illustration of a process of switching or removing a webcam device on the fly without breaking the peer-to-peer connections. The DeviceManager component can emit a webcam change event to the MediaManager component, which replaces the webcam device. The MediaManager component also removes the old video track and creates a new video track and then renegotiates the peer-to-peer connection during this operation.

Embodiments of the peer-to-peer communication system and method described herein can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

Other aspects and embodiments of the system and method include the following:

1. A peer to peer communication system, comprising:
    one or more processors and memory, and one or more modules incorporated into the one or more processors and memory, the one or more modules configured to provide machine-readable instructions stored in the memory that, upon execution by the one or more processors, carry out operations comprising:
        interfacing with an application running on a gaming engine to enable a first user in a session to control one or more avatars generated by the gaming engine application, wherein the gaming engine is operable using the one or more processors and memory and includes a rendering engine to generate the one or more avatars and an audio engine to generate sound;
        establishing a real-time peer-to-peer communication link between the first user and one or more additional users located remotely from the first user for transmission in real-time of audio, video, and data communications;
        capturing an incoming audio transmission and an incoming video transmission from input devices, operable by the first user during a session controlling the one or more avatars, and transmitting audio, video, and data to the gaming engine; and
        transmitting, in real time, synchronized audio, video, and data communications to the one or more additional users over the communication link.
2. The system of embodiment 1, wherein the transmitting step includes generating in a network layer synchronized audio, video, and data packets for transmission over the communication link to the additional users.
3. The system of embodiment 2, wherein establishing the peer-to-peer communication link further includes sending a connection request to a signal server and establishing a socket connection between the processor and the signal server, the socket connection comprising a bidirectional, persistent connection to support transactions initiated by either the first user or the one or more additional users.
4. The system of embodiment 3, wherein establishing the peer-to-peer communication link further includes exchanging SDP packets and ICE candidates with the signal server.
5. The system of any of embodiments 1-4, wherein interfacing with the gaming engine application includes interfacing between the gaming engine application and a set of browser-supported real-time application programming interfaces to provide real-time communication between remotely-located peers over the internet employing a web- or browser-based real-time communication protocol.
6. The system of embodiment 5, wherein interfacing with the gaming engine application further includes providing interoperability between a C# class library and C++ code and C++ classes provided by the set of browser-supported real-time application programming interfaces.
7. The system of any of embodiments 5-6, wherein interfacing with the gaming engine application includes instantiating a class of objects to interface between the set of application programming interfaces and the gaming engine application.
8. The system of any of embodiments 1-7, wherein interfacing with the gaming engine application includes combining video images from the gaming engine application with audio input from one or more audio input devices and a loopback audio input device into a single video file or a real time messaging protocol stream for transmission to one or more of: a first user; an additional user; a server; or a storage device
9. The system of any of embodiments 1-8, wherein the one or more modules are connectable to an audio recording device to record an incoming audio transmission and to an audio player device to play a recorded audio transmission.

10. The system of any of embodiments 1-9, wherein interfacing with the gaming engine application includes simultaneously receiving incoming audio streams from multiple users and directing a mixed audio stream to an audio player device.

11. The system of any of embodiments 1-10, wherein interfacing with the gaming engine application includes receiving a morphed audio input for the first user and transmitting the morphed audio input to the one or more additional users via the peer-to-peer communication link.

12. The system of any of embodiments 1-11, wherein the one or more modules are configured to record in real time incoming video and audio during a session and to transmit recorded video and audio to one or more of the first user and the additional users during the session using a real time messaging protocol.

13. The system of embodiment 12, wherein the one or more modules are further configured to mix two or more audio tracks from the first user's microphone and a loopback recorder for subsequent playback in synchronization with a video track.

14. The system of any of embodiments 12-13, wherein the recorded video and/or recorded audio are captured in one or both of high definition and low definition.

15. The system of embodiment 14, wherein one or both of the recorded video and recorded audio captured in high definition are stored on a local computer device and one or both of the recorded video and recorded audio captured in low definition are stored in a server.

16. The system of any of embodiments 1-15, wherein a video stream and an audio stream for each peer in a conference are each recorded on its own separate track.

17. The system of any of embodiments 1-16, wherein the one or more modules are configured to add or replace an audio or video device during a session, comprising:
receiving a request to replace a device;
removing a video or audio track associated with a removed device;
creating a new video or audio track for an added device; and
updating peer-to-peer connections between the first user and the additional users.

18. A method of providing peer to peer communication in a gaming engine application, comprising:
providing the peer-to-peer system of any of embodiments 1-17;
establishing a real-time peer-to-peer communication link between the first user and one or more additional users located remotely from the first user for transmission in real-time of audio, video, and data communications;
capturing an incoming audio transmission and an incoming video transmission from input devices operable by the first user while controlling the one or more avatars and transmitting audio, video, and data to the gaming engine; and
transmitting, in real time, synchronized audio, video, and data communications to the one or more additional users over the communication link.

19. The method of embodiment 18, wherein the peer-to-peer system is implemented as part of an avatar simulation system or video conference system employing user-controlled avatars.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A peer to peer communication system, comprising:
one or more processors and memory, and one or more modules incorporated into the one or more processors and memory, the one or more modules configured to provide machine-readable instructions stored in the memory that, upon execution by the one or more processors, carry out operations comprising:
interfacing with an application running on a gaming engine to enable a first user in a session to control one or more avatars generated by the gaming engine application, wherein the gaming engine is operable using the one or more processors and memory and includes a rendering engine to generate the one or more avatars and an audio engine to generate sound;
establishing a real-time peer-to-peer communication link between the first user and one or more additional users located remotely from the first user for transmission in real-time of audio, video, and data communications;
capturing an incoming audio transmission and an incoming video transmission from input devices, operable by the first user during the session controlling the one or more avatars, and transmitting audio, video, and data to the gaming engine; and
transmitting, in real time, synchronized audio, video, and data communications to the one or more additional users over the real-time peer-to-peer communication link;
wherein the one or more modules are configured to add or replace an audio or video device during the session, the configuring comprising:
receiving a request to replace a device;
removing a video or audio track associated with a removed device;
creating a new video or audio track for an added device; and
updating peer-to-peer connections between the first user and the additional users.

2. The peer to peer communication system of claim 1, wherein the transmitting includes generating in a network layer synchronized audio, video, and data packets for transmission over the realt-time peer-to-peer communication link to the additional users.

3. The peer to peer communication system of claim 2, wherein establishing the real-time peer-to-peer communication link further includes sending a connection request to a signal server and establishing a socket connection between the one or more processors and the signal server, the socket connection comprising a bidirectional, persistent connection to support transactions initiated by either the first user or the one or more additional users.

4. The peer to peer communication system of claim 3, wherein establishing the real-time peer-to-peer communication link further includes exchanging SDP packets and ICE candidates with the signal server.

5. The peer to peer communication system of claim 1, wherein interfacing with the gaming engine application includes interfacing between the gaming engine application and a set of browser-supported real-time application programming interfaces to provide real-time communication between remotely-located peers over an internet employing a web- or browser-based real-time communication protocol.

6. The peer to peer communication system of claim 5, wherein interfacing with the gaming engine application further includes providing interoperability between a C# class library and C++ code and C++ classes provided by the set of browser-supported real-time application programming interfaces.

7. The peer to peer communication system of claim 5, wherein interfacing with the gaming engine application includes instantiating a class of objects to interface between the set of broswer-supported real-time application programming interfaces and the gaming engine application.

8. The peer to peer communication system of claim 1, wherein interfacing with the gaming engine application includes combining video images from the gaming engine application with audio input from one or more audio input devices and a loopback audio input device into a single video file or a real time messaging protocol stream for transmission to one or more of: the first user; an additional user; a server; or a storage device.

9. The peer to peer communication system of claim 1, wherein the one or more modules are connectable to an audio recording device to record the incoming audio transmission and to an audio player device to play a recorded audio transmission.

10. The peer to peer communication system of claim 1, wherein interfacing with the gaming engine application includes simultaneously receiving incoming audio streams from multiple users and directing a mixed audio stream to an audio player device.

11. The peer to peer communication system of claim 1, wherein interfacing with the gaming engine application includes receiving a morphed audio input for the first user and transmitting the morphed audio input to the one or more additional users via the real-time peer-to-peer communication link.

12. The peer to peer communication system of claim 1, wherein the one or more modules are configured to record in real time incoming video and audio during the session and to transmit recorded video and audio to one or more of the first user and the additional users during the session using a real time messaging protocol.

13. The peer to peer communication system of claim 12, wherein the one or more modules are further configured to mix two or more audio tracks from a microphone of the first user and a loopback recorder for subsequent playback in synchronization with a video track.

14. The peer to peer communication system of claim 12, wherein the recorded video and/or recorded audio are captured in one or both of high definition and low definition.

15. The peer to peer communication system of claim 14, wherein one or both of the recorded video and recorded audio captured in high definition are stored on a local computer device and one or both of the recorded video and recorded audio captured in low definition are stored in a server.

16. The peer to peer communication system of claim 1, wherein a video stream and an audio stream for each peer in a conference are each recorded on its own separate track.

17. A method of providing peer to peer communication in a gaming engine application, comprising:
 providing the peer-to-peer communication system of claim 1;
 establishing the real-time peer-to-peer communication link between the first user and the one or more additional users located remotely from the first user for transmission in real-time of audio, video, and data communications;
 capturing the incoming audio transmission and the incoming video transmission from the input devices operable by the first user while controlling the one or more avatars and transmitting audio, video, and data to the gaming engine; and
 transmitting, in real time, synchronized audio, video, and data communications to the one or more additional users over the real-time peer-to-peer communication link.

18. The method of claim 17, wherein the peer-to-peer communication system is implemented as part of an avatar simulation system or video conference system employing user-controlled avatars.

* * * * *